Patented Nov. 5, 1940

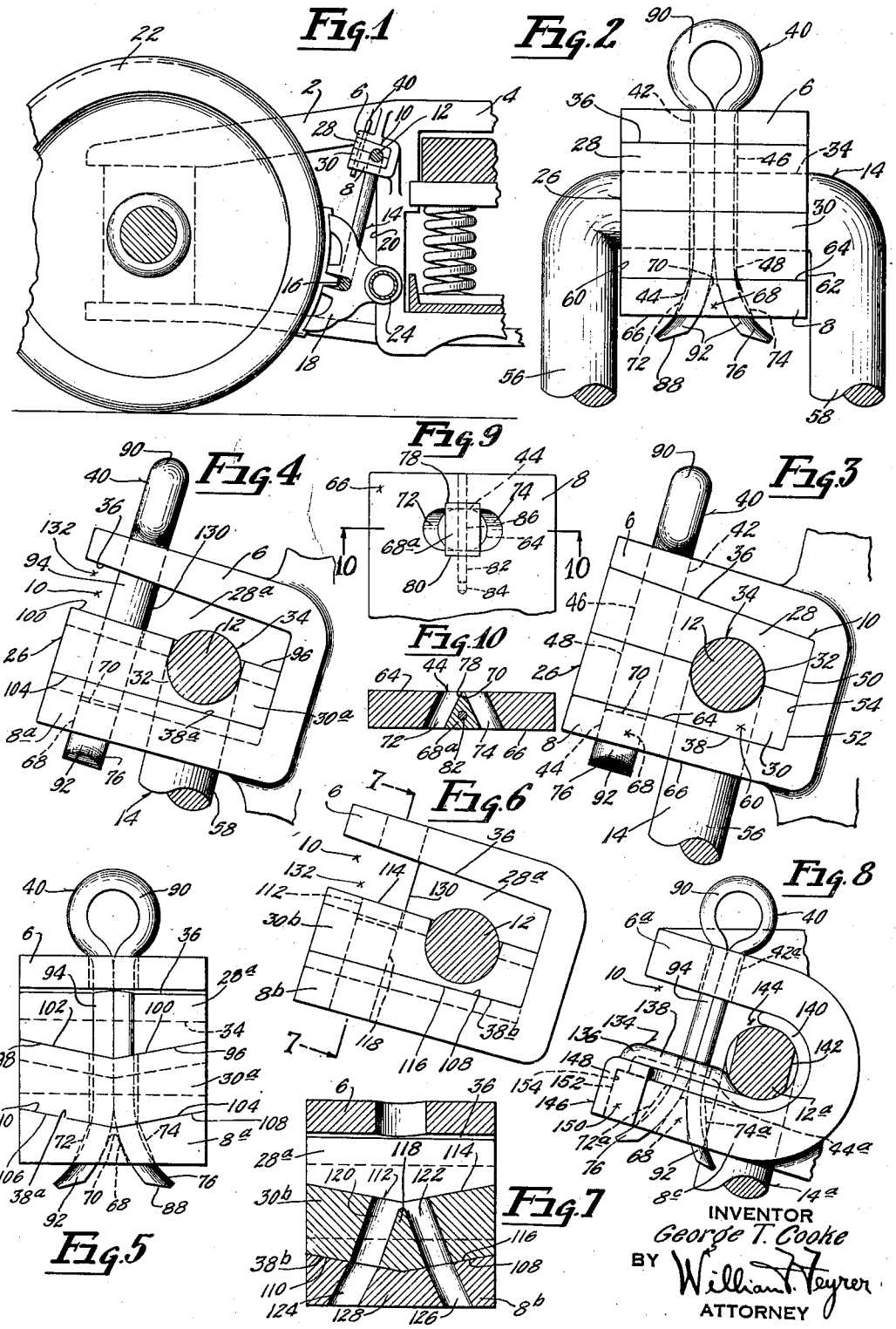

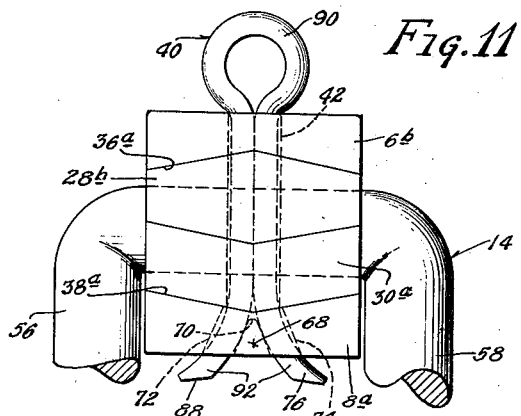
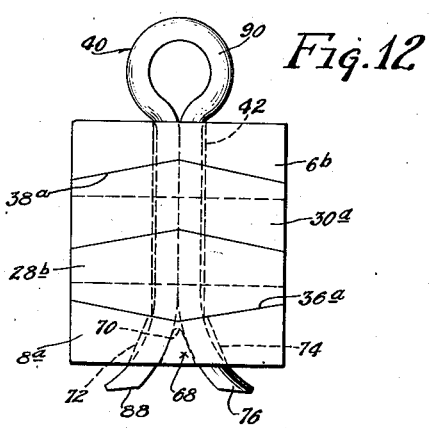
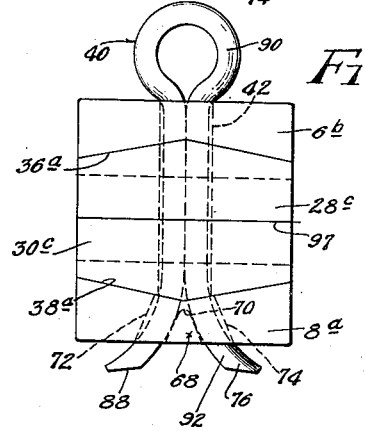
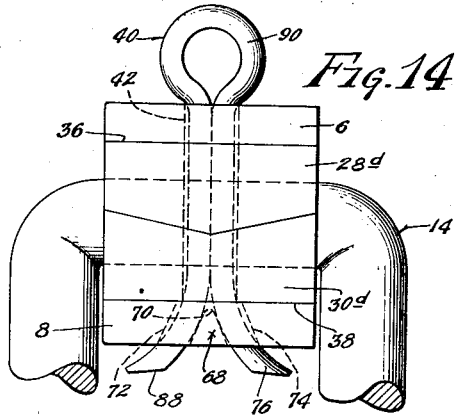
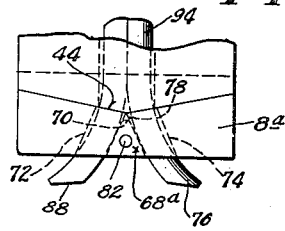
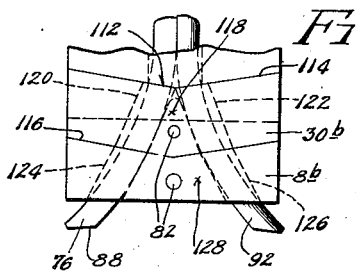
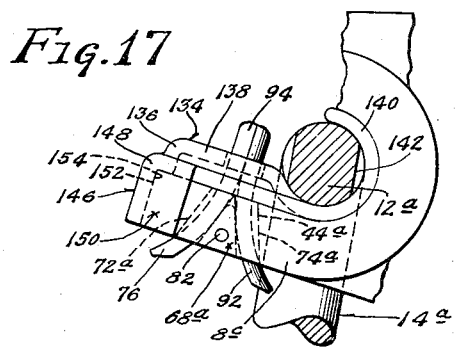

2,220,640

UNITED STATES PATENT OFFICE 2,220,640

BRAKE HANGER SUPPORT

George T. Cooke, Norwalk, Conn., assignor to American Railway Products Co., Inc., Darien, Conn., a corporation of New York Application January 11, 1938, Serial No. 184,411

19 Claims. (Cl. 188—209)

The present invention relates to devices for securing brakes and brake beam hangers, and especially the closed link type of hangers, to truck frames.

In brake hanger constructions, particularly for railroad trucks, it has been found that the hanger and its supporting means are subjected to considerable wear and that it is therefore desirable that these elements be of special construction to withstand such wear, and to increase their practical usefulness and life. Furthermore, the hangr and its supporting means must be secure to prevent the brake and closely associated parts from dropping and thereby causing possible derailment and wreckage of the car or train.

It is therefore the primary object of the present invention to provide a brake hanger construction, particularly for railroad trucks, which will withstand hard usage and wear for a comparatively long period of time, and to provide such a construction which will be securely maintained in place so as to increase the safety of operation of railroad cars and trains.

Another object of the invention resides in providing special means separate from the actual hanger and supporting structure of the truck frame for reducing the wear between these elements.

A further object consists in making these special wear-resisting means replaceable so that the brake and its associated elements can be easily assembled or removed; whereby, if after long usage the hanger itself or an element of the special means has become worn, such hanger or element can be easily replaced without requiring disassembly of the truck, the brake or the means for operating the brake.

Another object of the present invention resides in constructing the elements of the replaceable wear-resisting means so that they have the tendency to align or lock themselves in place relative to each other and to remain in such aligned or locked position regardless of hard usage.

Important features of the invention reside in: means for aligning the two sections of a split bushing; means for securing and locking these sections relative to each other and relative to the truck frame; means on the bushing for interconnecting the two bushing sections; interconnecting means on the bushing and on the supporting structure of the truck frame for preventing movement of the bushing in any direction except along a single axis; angular interengaging surfaces on the abutting sides of the sections of the bushing for aligning and locking the sections relative to each other; a socket structure integral with the truck frame; integral angular surfaces in said socket; and integral angular surfaces on the bushing interengaging with the angular surfaces in the socket for aligning and locking the bushing relative to the socket.

Still further objects and features reside in the provision of: one-piece or two-piece bushings of particular construction which may be easily replaced when worn or removed to make repairs to other parts; in the use of locking means for securing the bushing or bushings in place including a member having a plurality of arms, such as for example a cotter pin; in the particular structure or shape of such a cotter pin; and in the provision of means for spreading apart the legs thereof and locking them in spread position.

These and other objects and advantages of the present invention will be apparent in greater detail from the following description and drawings, in which:

Figure 1 is a fragmentary side view of a railway car truck, showing parts thereof in section.

Fig. 2 is an enlarged front view of the novel bushing and locking means therefor, provided by the present invention, applied to part of a car truck.

Fig. 3 is a fragmentary side view of the structure shown in Fig. 2.

Fig. 4 is a side view of a modified form of the present invention.

Fig. 5 is a front view of the modified form shown in Fig. 4.

Fig. 6 is a side view of another modification of the invention.

Fig. 7 is a cross-sectional view taken along line 7—7 of Fig. 6.

Fig. 8 is a side view of still another modification.

Fig. 9 is a fragmentary bottom view of a modified form of the invention.

Fig. 10 is a cross-sectional view taken along line 10—10 of Fig. 9.

Fig. 11 is a front view of another modification.

Fig. 12 is a view similar to Fig. 11 showing the bushing sections in reversed position.

Figs. 13 and 14 are front views of two further modifications.

Fig. 15 is a fragmentary view of a modified detail of the embodiments shown in Figs. 5, 11 and 13, respectively.

Figs. 16 and 17 are fragmentary views similar to Fig. 15, of a modified detail of the embodiments shown in Figs. 7 and 8, respectively.

Before describing the present improvements and mode of operation thereof in detail it should be understood that the invention is not limited to the details of construction and arrangement of parts shown in the accompanying drawings, which are merely illustrative of the present preferred embodiments, since the invention is capable of other embodiments, and the phraseology employed is for the purpose of description and not of limitation.

Referring now in detail to the drawings, the car truck 2 includes a main center section or truck frame 4 with both longitudinally and laterally extending projections 6 and 8 at the upper corners of the frame which are preferably integral with the casting or forging forming the main frame 4. These projections form a socket 10 in which the pivoting link 12 of a hanger 14 is secured which at its lower end is secured by a pivot connection 16 to a brakeshoe 18. This hanger 14 may be of the closed loop-shaped type extensively used in the art to which the present invention relates. However, any other type of angular hanger may be used in place of the particular hanger 14 shown in the drawings. The brakeshoes 18 may also be of any conventional type.

In the usual construction found extensively on railroads at the present time truck frames 4 are provided with a pair of sockets at each of the opposite ends 20 (only one being shown in Fig. 1 of the drawings) adjacent coaxial wheels 22. Likewise the brake hanger construction at each end 20 includes a pair of hangers 14 and a pair of brakeshoes 18 adjacent each pair of wheels 22, preferably interconnected as by a rod 24 so that the brakeshoes 18 move coordinately toward and away from the wheels when the brakeshoes are actuated either by hand, steam, or air in the usual manner.

As already indicated, the important feature of the present invention resides in the provision of a novel bearing for supporting the brake hangers 14. In accordance with the first embodiment of the invention, as shown in Figs. 2 and 3, this bearing comprises a bushing 26 preferably of split construction including an upper section 28 and a lower section 30. A semi-circular groove 32 may be provided in each of the sections 28 and 30, each groove forming one half of a bearing 34 for receiving and supporting the connecting link 12. Since the two sections 28 and 30 of the bushing 26 form relatively small elements separate from the adjacent supporting truck frame 4 and the projections 6 and 8 which are integral therewith, this bushing may be made of special wear-resisting material while the truck frame 4 including the projections 6 and 8 can be made of less expensive and less wear-resisting material.

According to the embodiment of the invention shown in Figs. 1 and 2, the two sections 28 and 30 of the bushing may also be made of identical shape so that the bushing can be assembled with greater facility and the two sections be exchanged one for the other if only one of the sections has become worn while the other section is still in good condition.

In order to prevent the bushing 26 from dropping out of the socket 10 and to prevent it from shifting therein, the present invention provides a novel aligning structure and a locking structure, shown in different modifications particularly in Figs. 2 through 7. In its simplest form, shown for example in Fig. 3, this aligning structure consists in making the upper and lower walls 36 and 38 of the bushing slightly inclined or wedge-shaped in longitudinal direction and the inner walls of the socket 10 of corresponding shape so that the latter exert a certain gripping action upon the outer walls of the bushing and tend to press the two sections 28 and 30 against each other.

In order to prevent longitudinal shifting of the bushing 26 within the socket 10, a cotter pin 40 may be pressed through coaxial holes 42 and 44 in the projections 6 and 8 of the frame 4 and similar holes 46 and 48 in the bushing sections 28 and 30. Inasmuch as the front walls 50 and 52 of sections 28 and 30 abut tightly against the inner wall 54 of socket 10, pivotal movement of the bushing 26 about the cotter pin 38 is prevented. Such pivotal movement and sliding relative to the connecting link 12 of hanger 14 is furthermore prevented by the arms 56 and 58 of the hanger 14 which are located in close proximity to the front and rear walls 60 and 62 respectively of the bushing 26, as shown particularly by Fig. 2.

Another important feature of the present invention resides in the particular means for spreading the cotter pin 40 automatically when the same is driven into and through the holes 42 to 48. For this purpose, the hole 44 in the lower projection 8 is of substantially circular shape at the upper surface 64 of the projection 8 and diverging toward the bottom surface 66 into a semi-elliptical shape. A wedge-shaped bridge 68, the apex 70 of which may be slightly rounded, divides the hole 44 into two semi-circular holes 72 and 74, each of which is slightly larger than the thickness of one of the prongs 76 of the cotter pin 40.

This bridge 68 may either be integral with the casting or forging of the projection 8 and the main truck frame itself, as shown for example by Figs. 2 to 5 and 8, or it may constitute a separate element 68a as shown in Figs. 9, 10, 15 and 16 which may be slightly longer than the smallest width of the hole 44 and sunk with a tight fit into corresponding grooves 78 and 80, for example as shown by Fig. 9. In order to lock the bridge 68a within the grooves 78 and 80 and to prevent the bridge from being forced out of these grooves, a pin or rod 82 is fitted tightly into a hole 84 in the free end of projection 8 and a coextensive hole 86 in the bridge 68a.

The two prongs 76 of the cotter pin 40 are preferably provided with adjacent bevelled or inclined cuts 88 to facilitate the spreading of the prongs by the wedge-shaped bridge 68 or 68a, respectively, and their properly entering into and aligning within the divergent semicircular holes 72 and 74 as the top or looped head 90 of the cotter pin 40 is struck with a hammer or the like.

It will be clear from the above description that for assembling the novel structure it is only necessary to place the bushing sections 28 and 30 around the connecting link 12 of the hanger 14, to slide this assembly into the socket 10 between the projections 6 and 8 of the truck frame 4 and to lock the bushing sections 28 and 30 and the connecting link 12 securely in place within the socket 10 by inserting the cotter pin 40 into the hole 42 of the upper projection 6 and striking the head 90 whereupon the wedge-shaped bridge 68, or 68a, respectively, spreads the prongs 76 apart which pass automatically into the divergent holes 72 and 74. By the wedging action of bridge 68, or 68a, and the shape and size of the holes 72 and 74, the lower end of the prongs 76 then assume substantially the shape shown for example in Fig. 2. The projecting outer ends 92 of prongs 76 then automatically curl outwardly of the holes 72 and 74 so that the cotter pin 40 is securely and permanently locked against accidental withdrawal and shifting relative to the projections 6 and 8 when the stem part 94 thereof is fully inserted into the holes 42, 44, 46 and 48.

After the prongs 76 of the cotter pin have thus been spread and locked in place, there is never any possibility of inadvertent or accidental separation of the bushing 26 from the socket 10. For retracting or removing the cotter pin 40 considerable force must be applied either by pulling upon the loop or head 90, as by inserting a rod or the like therein and pulling upon the same, or by striking one or both of the prongs 76 at the outer ends 92 thereof. As the cotter pin 40 is thus forced upwardly in the coaxial holes 42, 44, 46 and 48, the walls of the divergent holes 72 and 74 automatically close the prongs 76 to facilitate the subsequent and final upward movement through the coaxial holes.

In order to align the bushing sections accurately relative to each other, to insure thereby a smooth travel of the cotter pin 40 through the coaxial holes in the projections of the frame 4 and through the holes in the two bushing sections, and to prevent any transverse shifting of the two sections relative to each other, the present invention further provides special interlocking features between the two bushing sections and between the bushing and at least one of the projections of the truck frame 4.

According to the modification of the invention shown in Figs. 4 and 5, the upper bushing section 28a is provided at its lower surface with faces 96 and 98 which are angularly inclined relative to each other. The lower section 30a is of angular shape, as shown particularly by Fig. 5, so that its upper faces 100 and 102 conform and interlock with faces 96 and 98 of section 28a, while its lower faces 104 and 106 interlock with angular faces 108 and 110 at the upper surface of the lower projection 8a.

Obviously these means for interlocking the bushing sections with each other and with the projections of the truck frame may be modified in any suitable manner. For example, the interlocking surfaces may be shaped differently from the form shown in Figs. 4 and 5, some of the interlocking surfaces or elements may be omitted and the respective faces be plane as shown in Figs. 2 and 3, or additional interlocking surfaces or elements may be provided between the upper projection 6 and the upper bushing section 28, or 28a, respectively. As shown in Figs. 11 and 12, the outer walls 36a and 38a of the two bushing sections 28b and 30a may be made of similar contour and the upper projection 6b of similar contour as the lower projection 8a so that the two bushing sections 28b and 30a can be exchanged one for the other if the lower section 30a has become worn, similarly as described relative to Figs. 2 and 3.

The contacting faces 97 of the bushing sections 28c and 30c may also be plane or flat, as shown in Fig. 13, while the outer walls 36a and 38a may have similar angular contour, or, vice versa and as shown in Fig. 14, the contacting faces of the bushing sections 28d and 30d may be of angular extent, while the outer walls 36 and 38 may be plane or flat to fit between plane projections 6 and 8 of the frame, similarly as shown in Figs. 2 and 3.

If it appears desirable that the same kind of cotter pin 40 as shown in Figs. 2 to 5 be spread for a longer distance in order to increase the locking effect of the prongs 76, the wedge-shaped bridge which serves to spread the prongs 76 apart, may be extended into the hole of the lower bushing section. As shown in Figs. 6, 7 and 16, the lower section 30b is provided with a hole 112 of substantially circular shape at the upper surface 114 thereof and diverging toward the bottom surface 116 into a semi-elliptical shape. A wedge-shaped bridge 118, the apex of which is rounded, divides the hole 112 into two semicircular holes 120 and 122, each of which is slightly larger than the thickness of one of the prongs 76 of the cotter pin 40 so as to permit an easier insertion and bending of the prongs. Holes 120 and 122 also extend as holes 124 and 126 through the lower projection 8b, but preferably at a slightly larger angle relative to each other so as to increase the curling action of the prongs 76 in outward direction as already described relative to Fig. 2, or holes 124 and 126 may be of slightly larger diameter than holes 120 and 122. As shown in Fig. 7, the wedges or bridges 118 and 128 may either be integral with the lower bushing section 30b and the lower projection 8b, respectively, or, as shown in Fig. 16, they may form separate elements which may be secured in place by pins 82 in a similar manner as the bridge 68a, as shown in Figs. 9 and 10.

According to other modifications of the invention, shown in Figs. 4 to 7, one of the sections of the bushing 26 may be shorter in length than the other and extend only up to and against the cotter pin 40. Because of the interlocking surfaces 96, 98 and 100, 102, the upper section 28a is prevented from shifting transversally, while shifting in longitudinal direction is effectively prevented by the abutting of the front face 130 against the cotter pin 40 and also by the interengagement of the connecting link 12 with the bearing 34 in the upper bearing section 28a. Obviously, if the wedge or bridge for spreading apart the prongs 76 of the cotter pin 40 is only secured within the lower projection 8a, as shown in Figs. 4 and 5, and does not extend also into the lower bearing section 30b, as shown in Figs. 6 and 7, the outer walls of the two bearing sections may be of similar contour, as shown in Figs. 11 to 14, or even the entire bearing sections may be of identical shape and dimensions, as shown in Fig. 13, so that the two sections can be exchanged one for the other, as described relative to Figs. 2 and 3.

Figs. 8 and 17 disclose a slightly modified form of the present invention differing from the forms shown in Figs. 2 to 5 primarily in the provision of a one-piece bushing or wear plate 134 which may be made from a forging or casting. This bushing preferably consists of a body portion 136 including a projecting or raised portion 138 and an open loop or return bend portion 140 forming the bearing for the connecting link 12a of the hanger 14a which preferably is provided with flat surfaces 142 so that the thickness of the connecting link 12a intermediate flat surfaces 142 is substantially equal to the width of the opening 144 of the loop 140 for facilitating the entering of the link 12a into the loop.

The one-piece bushing preferably also includes a downwardly projecting portion or flange 146 comprising a front wall 148 and opposed walls 150 forming a socket 152 which fits closely around the outer end 154 of the lower projection 8c. By means of this socket 152, the one-piece bushing is secured in place and prevented from shifting transversally relative to the projections 6a and 8c. A cotter pin 40 is passed through coaxial holes 42a and 44a in the projections 6a and 8c and the hole 44a is provided with a transverse bridge or wedge 68 and semicircular divergent holes 72a and 74a similarly as shown in Fig. 2 and described above.

Other variations and modifications may be made within the scope of the present invention and portions of the improvements may be used without others.

Having thus described the invention, what is claimed as new is:

1. A brake hanger support including the combination of a truck frame having projections forming a socket and at least one aperture in at least one of said projections; a bushing within said socket and having an opening; a hanger in said opening; cotter means passing through said aperture for securing said bushing within said socket; and integral deforming means on one of said projections for locking said securing means into engagement with said projection.

2. A brake hanger support including the combination of a truck frame having projections forming a socket and at least one aperture in at least one of said projections; a bushing within said socket and having an opening for receiving a hanger; means passing through said aperture for securing said bushing within said socket; and means on one of said projections and at least partially within said aperture for locking said securing means into engagement with said projection.

3. A brake hanger support including the combination of a truck frame having projections forming a socket; a bushing within said socket and having an opening; a hanger in said opening; a cotter pin for locking said bushing within said socket; and means for deforming and locking said cotter pin.

4. A brake hanger support including the combination of a truck frame having projections forming a socket, and at least one aperture in at least one of said projections; a two-piece bushing within said socket and having an opening for receiving a hanger; a cotter pin passing through said aperture for securing said bushing within said socket; and means on one of said projections for deforming said cotter pin and locking the same into engagement with said projection.

5. A brake hanger support including the combination of a truck frame having projections forming a socket and at least one aperture in at least one of said projections; a two-piece bushing within said socket having an opening; a hanger in said opening; a cotter member having at least two arms passing through said aperture for securing said bushing within said socket; and means on one of said projections and at least partially within said aperture for spreading apart said arms.

6. A brake hanger support including the combination of a truck frame having projections forming a socket and divergent apertures in one of said projections; a bushing within said socket and having an opening for receiving a hanger; a cotter member passing through said divergent apertures and being spread apart by said apertures for securing said bushing within said socket.

7. A brake hanger support including the combination of a truck frame having projections forming a socket and at least one aperture in at least one of said projections; a split bushing fitting into said socket and having a bore; a hanger fitting into said bore; means for locking said split bushing together; a member having a plurality of arms passing through said aperture for securing said bushing within said socket; and a wedge-shaped element integral with one of said projections and extending at least partially into said aperture for spreading apart said arms.

8. A brake hanger support including the combination of a truck frame having projections forming a socket and at least one aperture in at least one of said projections; a split bushing fitting into said socket and having a bore; a hanger fitting into said bore; means for locking said split bushing together; a member having a plurality of arms passing through said aperture for securing said bushing within said socket; and means including a wedge-shaped element removably secured to one of said projections for spreading apart said arms.

9. A brake hanger support including the combination of a truck frame having an upper and a lower projection forming a socket and at least one aperture in at least one of said projections; a bushing fitting into said socket and having a bore; a hanger fitting into said bore, said bushing comprising two sections; means for interlocking said sections, one of said sections having an opening; a wedge-shaped element on said section and extending into said opening; means on one of said projections and extending into said aperture; and a member having a plurality of arms passing through said opening and said aperture, said element and said last means being adapted to spread apart said arms when said member is inserted into said opening and said aperture.

10. A brake hanger support including the combination of a truck frame having spaced projections forming a socket and at least one aperture in at least one of said projections; a bushing fitting into said socket and having a bore; a hanger fitting into said bore, said bushing comprising two sections, one of said sections having an opening; a member having a plurality of arms passing through said aperture and said opening for securing within said socket, the section having an opening, the other section abutting against said member and being thereby secured within said socket; a wedge-shaped element on one of said projections and extending at least partially into said aperture for spreading apart said arms when said member is inserted into said opening and said aperture.

11. A brake hanger support including the combination of a truck frame having spaced projections forming a socket and at least one aperture in at least one of said projections; a one-piece bushing for receiving a hanger fitting into said socket and having an opening; means on said bushing for confining the same to movement only in one direction; a member having a plurality of arms passing through said aperture and said opening; and a wedge-shaped element on one of said projections and extending at least partially into said aperture for spreading apart said arms when said last member is inserted into said opening and said aperture.

12. In a brake hanger support the combination of a truck frame having projections forming a socket; a bushing in said socket for receiving a hanger; integral means on at least one of said projections and on said bushing confining said bushing to movement only in one direction; a cotter pin for locking said bushing within said socket; and means on one of said projections for deforming said cotter pin.

13. In a brake hanger support the combination of a truck frame having projections forming a socket; a two-part split bushing in said socket for receiving a hanger, one of said parts having a V-shaped recess; a V-shaped projection on one of said parts adapted to engage said V-shaped recess to prevent relative shifting; and means for locking said split bushing in the socket.

14. In a brake hanger support the combination of a truck frame having projections forming a socket; at least one of said projections having an aperture; a two-part split bushing in said socket for receiving a hanger; at least one of the parts of the bushing being provided with an aperture; one of the parts of the bushing being provided with a V-shaped recess and the other having a V-shaped projection engaging therewith to prevent relative shifting; and a member fitting into the apertures in said projection and said split bushing.

15. In a brake hanger support the combination of a truck frame having projections forming a socket; at least one of which is provided with an aperture; a two-part split bushing in said socket for receiving a hanger; only one of the parts of said bushing being provided with an aperture; associated angularly disposed walls on each part of said split bushing to prevent relative shifting; and a member fitting into the apertures in said projection and said split bushing.

16. In a brake hanger support the combination of a truck frame having projections forming a socket, one of said projections having a V-shaped recess; a bushing in said socket for receiving a hanger; angularly disposed walls on said bushing adapted to fit against said V-shaped recess to prevent relative shifting; means for locking said bushing within said socket; and means on one of said projections for deforming said locking means.

17. In a brake hanger support the combination of a truck frame having projections forming a socket; a two part split bushing in said socket for receiving a hanger; associated V-shaped interfitting means on each part of said split bushing; and associated V-shaped interfitting means on said split bushing and at least one of said projections to prevent relative shifting.

18. A brake hanger support including the combination of a truck frame having projections, one disposed in spaced relation above the other and forming a socket and an aperture in at least one of said projections; a bushing removably secured within said socket and having a bore, said bushing having means for at least partially embracing at least one of said projections; means passing through said aperture for securing said bushing within said socket; means for deforming said securing means; and a hanger removably secured within the bore of the bushing.

19. A brake hanger support comprising a truck frame having projections forming a socket, at least one of said projections having a V-shaped recess; a split bushing comprising a plurality of sections in said socket for receiving a hanger; and converging walls on at least one of said sections adapted to fit into the V-shaped recess of a projection to prevent lateral shifting of said bushing sections relative to each other and of the bushing relative to the projections.

GEORGE T. COOKE.